United States Patent
Johnson et al.

(10) Patent No.: US 7,916,646 B2
(45) Date of Patent: *Mar. 29, 2011

(54) METHOD AND APPARATUS FOR PROVIDING QUEUE DELAY INTERNAL OVERLOAD CONTROL

(75) Inventors: Carolyn Roche Johnson, Holmdel, NJ (US); Eric Noel, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 106 days.

This patent is subject to a terminal disclaimer.

(21) Appl. No.: 12/335,324

(22) Filed: Dec. 15, 2008

(65) Prior Publication Data

US 2010/0149986 A1 Jun. 17, 2010

(51) Int. Cl.
*G08C 15/00* (2006.01)
(52) U.S. Cl. ......... 370/236; 370/229; 370/230; 370/235

(58) Field of Classification Search .................. 370/229, 370/230, 232, 235, 236, 241, 252; 379/111, 379/112.01, 112.06, 112.1
See application file for complete search history.

(56) References Cited

U.S. PATENT DOCUMENTS

| | | | |
|---|---|---|---|
| 5,812,533 A * | 9/1998 | Cox et al. ................. 370/259 |
| 6,442,139 B1 * | 8/2002 | Hosein ...................... 370/236 |
| 6,445,707 B1 * | 9/2002 | Iuoras et al. ............. 370/395.43 |
| 2006/0245359 A1 * | 11/2006 | Hosein ...................... 370/235 |
| 2009/0285099 A1 * | 11/2009 | Kahn et al. ................ 370/236 |

* cited by examiner

*Primary Examiner* — Chi H Pham
*Assistant Examiner* — Weibin Huang

(57) ABSTRACT

A method and apparatus for handling an overload condition in a communication network are disclosed. For example, the method calculates a call target rate by at least one core signaling network element. The method then uses the call target rate by the at least one core signaling network element to start throttling signaling traffic if a total queueing delay of the at least one core signaling network element exceeds a predefined high threshold in a measurement interval.

12 Claims, 4 Drawing Sheets

US 7,916,646 B2

METHOD AND APPARATUS FOR PROVIDING QUEUE DELAY INTERNAL OVERLOAD CONTROL

The present invention relates generally to communication networks and, more particularly, to a method and apparatus for providing queue delay internal overload controls for signaling traffic in communication networks, e.g., packet networks such as Internet Protocol (IP) networks, Internet Protocol (IP) Multimedia Subsystem (IMS) networks, and Voice over Internet Protocol (VoIP) networks.

BACKGROUND OF THE INVENTION

Capacity of telephony networks is traditionally optimized to carry load during busy hour traffic while subject to some level of congestion and/or failure of network elements within a network. However, it is not engineered to account for extremely large traffic surges caused by exception events.

SUMMARY OF THE INVENTION

In one embodiment, the present invention enables a core signaling network element within a network to dynamically adjust a blocking rate of incoming calls received from a plurality of edge signaling network elements based on a target queueing delay parameter. For example, the method calculates a call target rate by at least one core signaling network element. The method then uses the call target rate by the at least one core signaling network element to start throttling signaling traffic if a total queueing delay of the at least one core signaling network element exceeds a predefined high threshold in a measurement interval.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Capacity of telephony networks is traditionally optimized to carry load during busy hour traffic while subject to some level of congestion and/or failure of network elements within a network. However, it is not engineered to account for extremely large traffic surges caused by exception events, such as the sudden increase in call volumes experienced after a major disaster, during contests of a highly popular television show in which viewers can participate by voting via telephony endpoint devices, or following an advertisement campaign after which a large number of customers calling to a particular toll free number within a short period of time. To cope with such exception events, operators rely on traditional network management capabilities to handle the sudden increase in traffic load effectively. However, in new and emerging packet based network, such as SIP based servers within IP networks, there are new challenges to be addressed. For example, the SIP protocol introduces new messages and requires a larger number of messages per call than in traditional telephony networks. In addition, routing within SIP networks often involves multiple routing choices to elements that can have varying capacities. SIP servers need to be able to protect against traffic surges, and need to maximize throughput during traffic overload.

Figure 1:
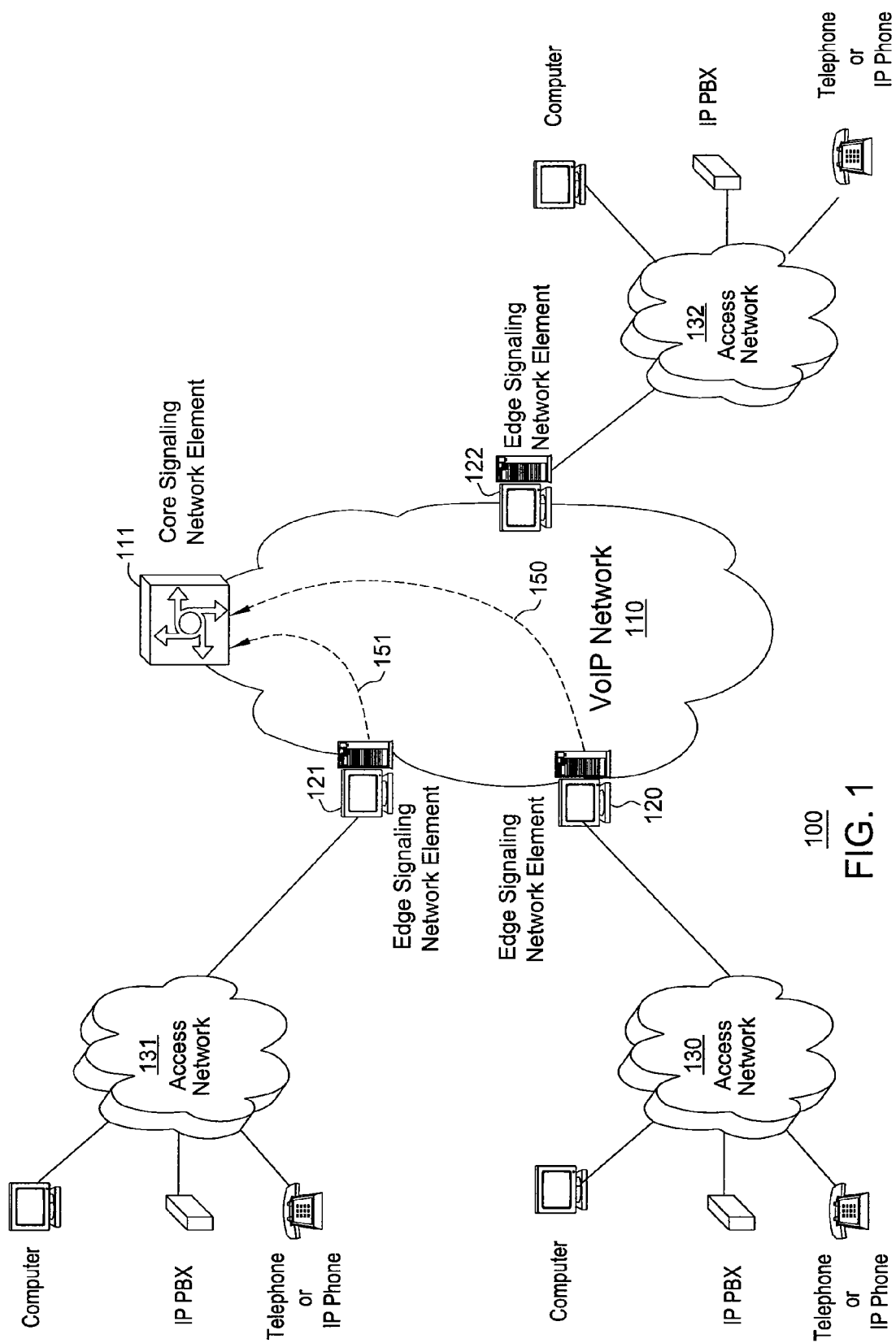
FIG. 1 illustrates an exemplary packet network related to the present invention.

To address this criticality, the present invention enables queue delay internal overload control for signaling traffic in a packet network, e.g., a VoIP network. FIG. 1 illustrates an illustrative packet network 100, e.g., a VoIP network, related to the present invention. In FIG. 1, three edge signaling network elements 120, 121, and 122 are deployed at the edge of VoIP network 110 interconnecting access networks 130, 131, and 132, respectively. Core signaling network element 111 is interconnected with edge signaling network elements 120, 121, and 122 via the VoIP network 110. In general, a plurality of core signaling network elements and a plurality of edge signaling networks can exist in VoIP network 110.

Note that examples of an edge signaling network element include a Media Gateway or a Session Border Controller that performs signaling, media control, security, and call admission control and related functions for calls originated from an access network and to be processed by a core signaling network element. The core signaling network element resides within the packet core infrastructure and communicates with the edge signaling network elements using e.g., the Session Initiation Protocol (SIP) over the underlying IP network 110.

The core signaling network element 111 can be implemented for example as a Media Gateway Controller, a Softswitch, an Application Server (AS), or a Call Session Control Function (CSCF) in an Internet Protocol Multimedia Subsystem (IMS) network and performs network wide call control related functions.

SIP is an example signaling protocol used between signaling network elements, and is discussed here to illustrate a signaling communications network. Broadly defined, SIP is an Internet Engineering Task Force (IETF) signaling protocol standard for creating, modifying, and terminating call sessions. These sessions include, but are not limited to, internet telephone calls, multimedia distributions, and multimedia conferences etc. SIP invitations (used to create sessions) carry session descriptions that allow entities to agree on a set of compatible media types. SIP makes use of elements called proxy servers to help route call requests, authenticate and authorize users for services, implement provider call-routing policies, and provide features to users. In FIG. 1, edge signaling network elements 120, 121, and 122 are edge proxies and core signaling network element 111 is a core proxy according to the SIP protocol standard. IMS is an architectural framework for delivering Internet Protocol (IP) multimedia to mobile users defined by the standard body, 3rd Generation Partnership Project (3GPP).

In one example, during an exception event in which a large volume of calls are placed by callers destined to access network 132, edge signaling network elements 120 and 121 process call requests originating from access networks 130 and 131 and forward the requests to core signaling network element 111 for further processing using flows 150 and 151, respectively. If the total call volume far exceeds the processing capacity of the core signaling network element 111, core signaling network element 111 can become so congested that it results in a catastrophic failure in which no calls can be processed at all. In this case, call requests destined to edge signaling network element 122 will not be processed by core signaling network element 111 for call completion to access network 132.

Figure 2:
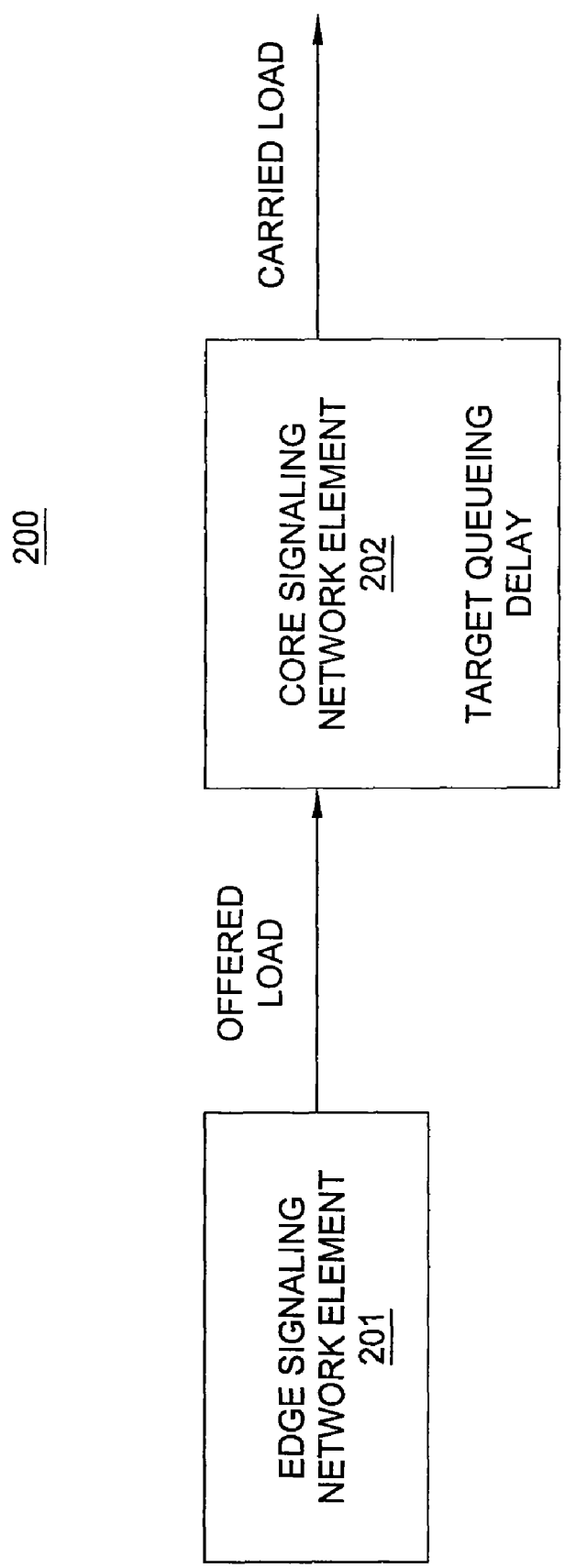
FIG. 2 illustrates an exemplary queue delay internal overload control system related to the present invention.

FIG. 2 illustrates an illustrative queue delay internal overload control mechanism 200 related to the present invention. In order to prevent the aforementioned catastrophic failures from occurring at a core signaling network element, the present invention enables the core signaling network element to internally reject incoming traffic. In FIG. 2, an offered load of rate, $\lambda_{offered}$, arrives at the core signaling network element 202 from the edge signaling network element 201. Under overload conditions, the call target load of rate, $\lambda_{target}$, processed by the core signaling network element 202 is internally and dynamically adjusted to prevent the core signaling network element 202 from being overloaded.

Figure 3:
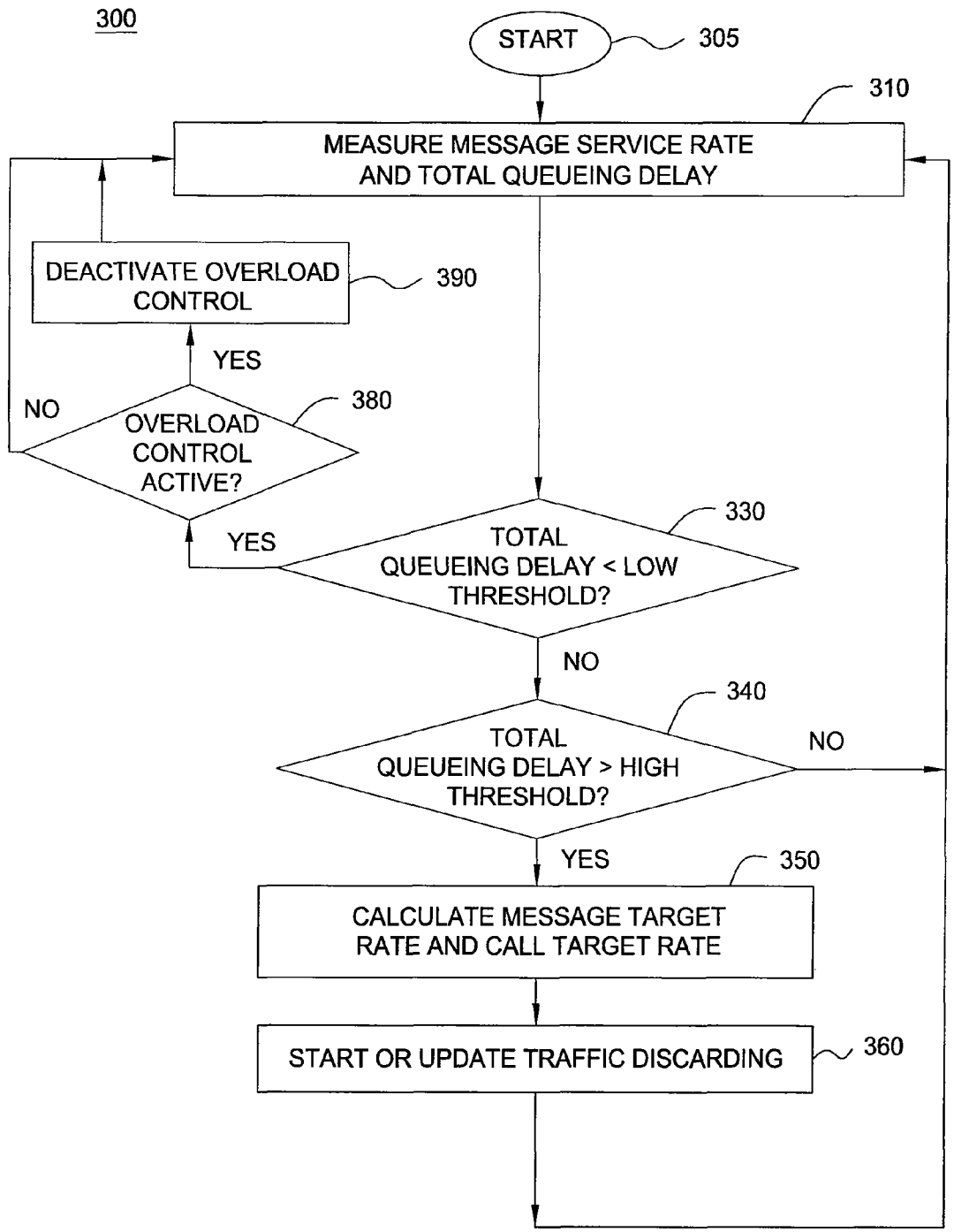
FIG. 3 illustrates a flowchart of a method for internal rate overload control in a packet network of the present invention.

FIG. 3 illustrates a flowchart of a method 300 for providing an internal overload control in a packet network, e.g., a VoIP network, of the present invention. For example, one or more steps of method 300 can be performed by a core signaling network element.

Method 300 starts in step 305 and proceeds to step 310. In step 310, in a measurement interval t, the method 300 measures the message service rate, $\mu_t$, (e.g., in units of messages per second) and the total queueing delay of the core signaling network element. In one embodiment, the message service rate is calculated by dividing the number of signaling messages processed in a predefined time interval T by the total busy processor time within T. In one embodiment, the total queuing delay, $d_t$, is calculated by dividing the signaling message queue length by the measured message service rate, $\mu_t$, at the end of the predefined time interval T. Note that T is a user configurable parameter representing the duration of a sampling interval and, for example could be set to 0.1 second. The minimum value of $\mu_t$ is zero. It should be noted that when $\mu_t$ is less than or equal to 0, then $d_t$ is set to 0. It should be noted that the various values that are provided above and below are only illustrative and should not be interpreted as a limitation of the present invention. Namely, these values can be selected in accordance with the requirements of a particular implementation.

In step 330, the method checks if the total queuing delay, $d_t$, is below a predefined low threshold. If the total queuing delay is below the predefined low threshold, the method proceeds to step 380; otherwise, the method proceeds to step 340. In one embodiment, the predefined low threshold is calculated by multiplying a predefined low watermark factor, $\beta$, with a predefined target queueing delay parameter, $d_e$, where $\beta$ and $d_e$ are user configurable parameters that can be set, for exemplary purposes only, to 0.1 and 0.2 second, respectively.

In step 340, the method checks if the measured total queuing delay, $d_t$, exceeds a predefined high threshold. If the total queueing delay has exceeded the predefined high threshold, the method proceeds to step 350; otherwise, the method proceeds back to step 310 to process the next measurement time interval. In one embodiment, the predefined high threshold is calculated by multiplying a predefined high watermark factor, $\alpha$, with a predefined target queueing delay parameter, $d_e$, where $\alpha$ and $d_e$ are user configurable parameters that can be set to 0.9 and 0.2 seconds, respectively, for illustrative purposes.

In step 350, the method calculates the message target rate for internal rate overload control purposes. In one embodiment, the message target rate, $\lambda_t$, is defined as:

$$\lambda_t = \lambda_t * (1 - (d_t - d_e)/C), \text{ where}$$

$d_e$ is the user configurable target queueing delay and C is a user configurable control interval duration that can be set to 0.2 seconds and 0.1 seconds, respectively, for illustrative purposes. The expression $\mu_t*(d_t-d_e)/C$ is equivalent to the signaling message queue backlog. The message target rate is the desired signaling message service rate (e.g., measured in units of messages per second) at or below which the core signaling network element is targeted for processing incoming signaling messages from a plurality of edge signaling network elements.

In one embodiment, the calculated message target rate is further divided by the estimated messages per call parameter, $r_t$, to obtain the call target rate, $\lambda_t/r_t$, (e.g., measured in units of calls per second). The call target rate is the desired call service rate (e.g., measured in units of calls per second) at or below which the core signaling network element is targeted for processing incoming calls from a plurality of edge signaling network elements. Note that $r_t$ is the Exponentially Weighted Moving Average (EWMA) estimate derived from dividing the measured incoming message rate by the measured incoming call rate.

It should be noted that message and call rates are the counts of incoming messages and calls during the measurement interval T. It should be noted that any method for estimating messages per call can be used. The weight, w, used in calculating the EWMA estimate of $r_t$ is a user configurable parameter, for example set to 0.8. It should be noted that EWMA or any equivalent smoothing algorithm can be used.

In step 360, the method starts or updates discarding incoming signaling traffic based on the calculated call target rate. The method then proceeds back to step 310 to process the next measurement time interval. Note that the core signaling network element throttles signaling traffic at the call level. In other words, the core signaling network element rejects signaling messages on a combination of call and signaling message type. For example, the core signaling network element may reject the messages based on the type of signaling message for any given call. This allows the ability to give priority to messages related to calls that are already in progress and discarding only new call messages.

In one embodiment of the present invention, the core signaling network element throttles offered signaling traffic based on a blocking percentage derived from the call target service rate parameter. For instance, in one embodiment of the present invention, the blocking percentage used to discard offered traffic can be expressed as ((offered load in units of calls per second/call target rate in units of calls per second)−1). In another embodiment of the present invention, the core signaling network element throttles offered signaling traffic using a leaky bucket algorithm according to the calculated call target rate parameter. Furthermore, blocking algorithms such as window algorithms, or gap algorithms can also be used. It should be noted that any commonly known throttling algorithms can be used.

In step 380, the method checks if queue delay internal overload control is already active. If the overload control is already active, the method proceeds to step 390; otherwise, the method proceeds back to step 310 to process the next measurement time interval.

In step 390, the method deactivates the queue delay internal overload control and stops throttling signaling traffic received from edge signaling network elements. The method then proceeds back to step 310 to process the next measurement time interval.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
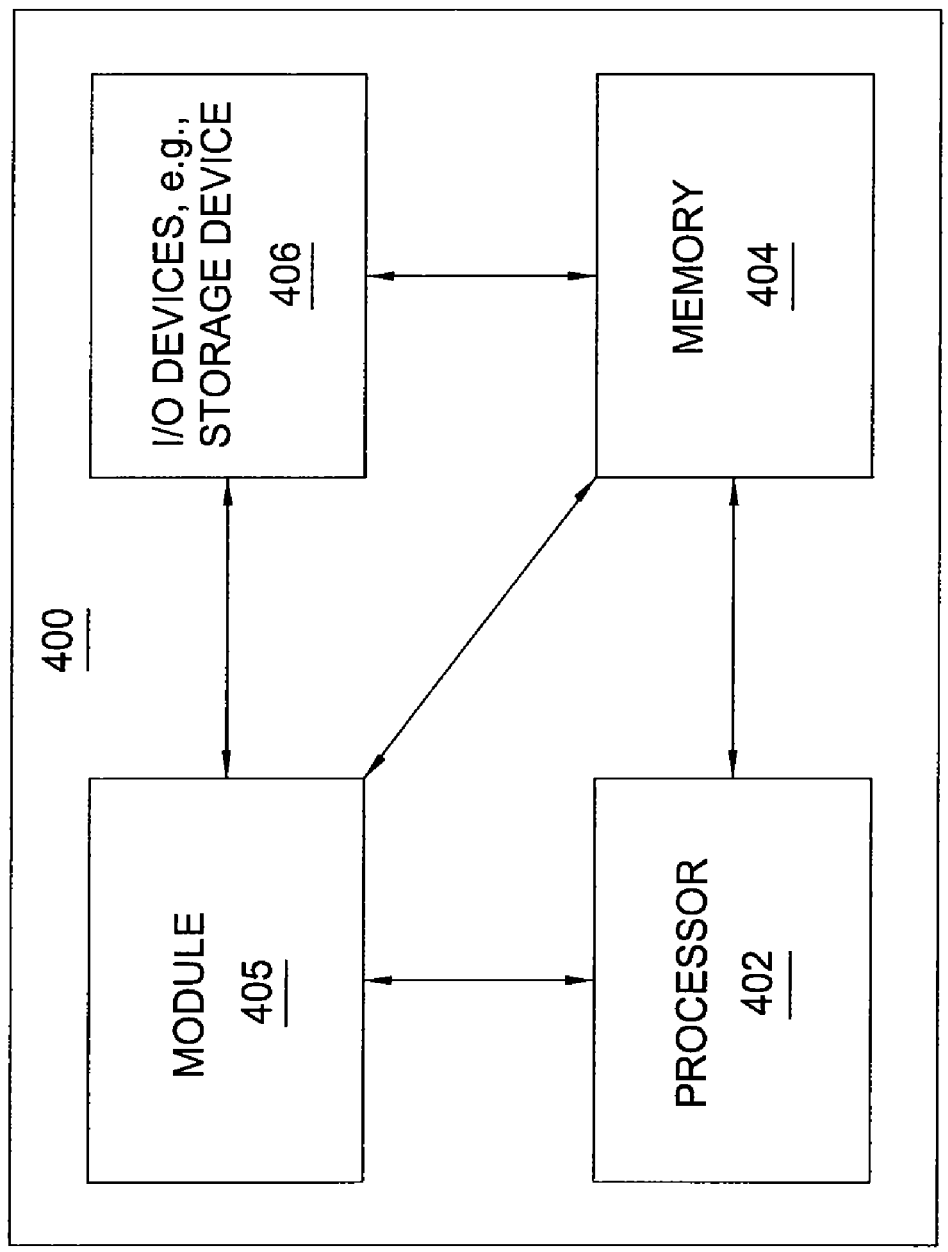
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing an internal rate overload control, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing a queue delay based internal overload control can be loaded into memory 404 and executed by processor 402 to implement the functions as discussed above. As such, the present process 405 for providing a queue delay based internal overload control (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling an overload condition in a communication network, comprising:
   calculating a call target rate by a core signaling network element; and
   using the call target rate by the core signaling network element to start throttling signaling traffic if a total queueing delay of the core signaling network element exceeds a predefined high threshold in a measurement interval, wherein the call target rate is calculated by dividing a message target rate, $\lambda_t$, by an estimated messages per call parameter, $r_t$, to obtain the call target rate, $\lambda_t/r_t$, wherein the message target rate, $\lambda_t$, is defined as $\lambda_t = \mu_t * (1-(d_t-d_e)/C)$, where $d_e$ is a target queueing delay parameter, C is a control interval duration, $\mu_t$ is a message service rate, and $d_t$ is a total queueing delay.

2. The method of claim 1, wherein a predefined low threshold is calculated by multiplying a low watermark factor, $\beta$, with the target queueing delay parameter, $d_e$, and the predefined high threshold is calculated by multiplying a high watermark factor, $\alpha$, with the target queueing delay parameter, $d_e$.

3. A method for handling an overload condition in a communication network, comprising:
   calculating a call target rate by a core signaling network element; and
   using the call target rate by the core signaling network element to start throttling signaling traffic if a total queueing delay of the core signaling network element exceeds a predefined high threshold in a measurement interval, wherein the call target rate is calculated by dividing a message target rate, $\lambda_t$, by an estimated messages per call parameter, $r_t$, to obtain the call target rate, $\lambda_t/r_t$, wherein the estimated messages per call parameter, $r_t$, is an estimate derived from dividing a measured message rate by a corresponding measured call rate.

4. The method of claim 3, wherein a predefined low threshold is calculated by multiplying a low watermark factor, $\beta$, with a target queueing delay parameter, $d_e$, and the predefined high threshold is calculated by multiplying a high watermark factor, $\alpha$, with the target queueing delay parameter, $d_e$.

5. A non-transitory computer-readable medium having stored thereon a plurality of instructions, the plurality of instructions including instructions which, when executed by a processor, cause the processor to perform a method for handling an overload condition in a communication network, comprising:
   calculating a call target rate by a core signaling network element; and
   using the call target rate by the core signaling network element to start throttling signaling traffic if a total queueing delay of the core signaling network element exceeds a predefined high threshold in a measurement interval, wherein the call target rate is calculated by dividing a message target rate, $\lambda_t$, by an estimated messages per call parameter, $r_t$, to obtain said call target rate, $\lambda_t/r_t$, wherein the message target rate, $\lambda_t$, is defined as $\lambda_t = \mu_t * (1-(d_t-d_e)/C)$, where $d_e$ is a target queueing delay parameter, C is a control interval duration, $\mu_t$ is an message service rate, and $d_t$ is a total queueing delay.

6. The non-transitory computer readable medium of claim 5, wherein a predefined low threshold is calculated by multiplying a low watermark factor, $\beta$, with the target queueing delay parameter, $d_e$, and the predefined high threshold is calculated by multiplying a high watermark factor, $\alpha$, with the target queueing delay parameter, $d_e$.

7. A non-transitory computer-readable medium having stored thereon a plurality of instructions, the plurality of instructions including instructions which, when executed by a processor, cause the processor to perform a method for handling an overload condition in a communication network, comprising:
   calculating a call target rate by a core signaling network element; and
   using the call target rate by the core signaling network element to start throttling signaling traffic if a total queueing delay of the core signaling network element exceeds a predefined high threshold in a measurement interval, wherein the call target rate is calculated by dividing a message target rate, $\lambda_t$, by an estimated messages per call parameter, $r_t$, to obtain said call target rate, $\lambda_t/r_t$, wherein the estimated messages per call parameter, $r_t$, is an estimate derived from dividing a measured message rate, by a corresponding measured call rate.

8. The non-transitory computer readable medium of claim 7, wherein a predefined low threshold is calculated by multiplying a low watermark factor, $\beta$, with a target queueing delay parameter, $d_e$, and the predefined high threshold is calculated by multiplying a high watermark factor, $\alpha$, with the target queueing delay parameter, $d_e$.

9. An apparatus for handling an overload condition in a communication network, comprising:

means for calculating a call target rate by a core signaling network element; and means for using the call target rate by the core signaling network element to start throttling signaling traffic if a total queueing delay of the core signaling network element exceeds a predefined high threshold in a measurement interval, wherein the call target rate is calculated by dividing a message target rate, $\lambda_t$, by an estimated messages per call parameter, $r_t$, to obtain the call target rate, $\lambda_t/r_t$, wherein the message target rate $\lambda_t$, is defined as $\lambda_t=\mu_t*(1-(d_t-d_e)/C)$, where $d_e$ is a target queueing delay parameter, C is a control interval duration, $\mu_t$ is an message service rate, and $d_t$ is a total queueing delay.

10. The apparatus of claim 9, wherein a predefined low threshold is calculated by multiplying a low watermark factor, $\beta$, with the target queueing delay parameter, $d_e$, and the predefined high threshold is calculated by multiplying a high watermark factor, $\alpha$, with the target queueing delay parameter, $d_e$.

11. An apparatus for handling an overload condition in a communication network, comprising:

means for calculating a call target rate by a core signaling network element; and means for using the call target rate by the core signaling network element to start throttling signaling traffic if a total queueing delay of the core signaling network element exceeds a predefined high threshold in a measurement interval, wherein the call target rate is calculated by dividing a message target rate, $\lambda_t$, by an estimated messages per call parameter, $r_t$, to obtain the call target rate, $\lambda_t/r_t$, wherein the estimated messages per call parameter, $r_t$, is an estimate derived from dividing a measured message rate, by a corresponding measured call rate.

12. The apparatus of claim 11, wherein a predefined low threshold is calculated by multiplying a low watermark factor, $\beta$, with a target queueing delay parameter, $d_e$, and the predefined high threshold is calculated by multiplying a high watermark factor, $\alpha$, with the target queueing delay parameter, $d_e$.

* * * * *